ated Apr. 27, 1971

United States Patent

[11] 3,576,365

| [72] | Inventor | George W. Callum |
| | | Canning Town, England |
| [21] | Appl. No. | 767,195 |
| [22] | Filed | Oct. 14, 1968 |
| [45] | Patented | Apr. 27, 1971 |
| [73] | Assignee | Moore Business Forms, Inc. |
| | | Niagara Falls, N.Y. |
| [32] | Priority | Oct. 19, 1967 |
| [33] | | Great Britain |
| [31] | | 47,737/67 |

[54] PHOTO-COMPOSING MACHINES
5 Claims, 13 Drawing Figs.

[52] U.S. Cl. .................................................. 355/43,
355/45, 355/66
[51] Int. Cl. .................................................. G03b 27/70
[50] Field of Search .......................................... 355/40, 43,
44, 45, 66

[56]         References Cited
        UNITED STATES PATENTS
3,320,851   5/1967   Fischer ........................ 355/43X
3,458,253   7/1969   Hansen ........................ 355/43X Primary Examiner—Samuel S. Matthews
Assistant Examiner—Richard A. Wintercorn
Attorney—Watson, Cole, Grindle & Watson ABSTRACT: A representation of a copy form is displayed and an image pattern is projected onto the representation so that the light image pattern is identical with and overlies part of the copy form. A sensitized material is irradiated with actinic light in a pattern corresponding to the projected pattern. The positions of the projected and exposed patterns are adjusted to expose the entire copy form onto the sensitized material.

PATENTED APR 27 1971 3,576,365

Inventor
George W. Callum
BY Watson, Cole, Grindle & Watson
Attorneys

PHOTO-COMPOSING MACHINES

This invention has reference to photocomposing machines and is more particularly concerned with photocomposing machines for business forms.

In photocomposing machines it is known to provide a carrier for a piece of sensitized material sometimes referred to as sensitized film. This carrier is mounted in the machine in such a way that the carrier traverses the machine. At intervals during its traverse, the film is subjected to treatment by actinic light whereby lines are exposed on the film so that a pattern is produced on the film which corresponds to the layout of part of the business form to be produced. Alternatively a mirrored image of the pattern is produced.

In such a machine the lines are formed on the sensitized film to correspond to the ruled lines on a business form by a process in which light is passed through a slit between a pair of plates in a shield to expose the film. The size of this slit is adjustable so that the length and thickness of lines produced on the business forms may be varied. The film is moved through the machine by a drive means embodying a lead screw and this lead screw is connected up to calibration means so that the position of the lines on the business form may be determined. In such a machine provision is also made for exposing certain parts of the film to a pattern which corresponds to typographical information on the form. This is achieved at another location on the machine. After the film has been exposed it is developed and further treated to produce a printing plate by known chemical methods. This printing plate is used to print business forms.

To effect the reproduction of the typographical characters and ruled lines it is necessary to determine the position of the characters and ruled lines by an accurate calibration operation on the business form and this is somewhat time consuming. Moreover, the machine because it embodies an accurate lead screw and certain reproduction means is somewhat expensive.

It is an object of the present invention to provide a more simple machine or machines by means of which a film may be exposed in a simple and convenient manner with a pattern in such a way as to correspond to the layout of a selected business form.

In accordance with one aspect of the present invention a photocomposing machine comprises means for irradiating a copy form to reproduce an image of the copy form on a viewing screen, means to project an image of light in a pattern onto the viewing screen corresponding to a part of the image of the copy form and to irradiate sensitized material with actinic light at positions corresponding to the positions of the irradiated pattern of light on the viewing screen to expose the film according to the irradiated pattern and means to adjust the position of the pattern of light on the viewing screen and the sensitized material whereby the sensitized material is exposed to correspond to the image of the copy form.

In accordance with another aspect of the present invention a method of exposing a sensitized material to prepare a printing plate comprises irradiating a copy form to reproduce an image of the copy form on a viewing screen, irradiating an image of light in a pattern onto the viewing screen corresponding to a part of the image of the copy form and irradiating the said image of light on to the sensitized material at positions corresponding to the irradiated pattern on the viewing screen to expose the sensitized material according to the irradiated pattern and adjusting the positions of the pattern of light on the viewing screen and on the sensitized material whereby the sensitized material is exposed to correspond to the image of the copy form.

A photocomposing machine in accordance with the invention will now be described by way of example with reference to the accompanying drawings wherein.

Figure 1:
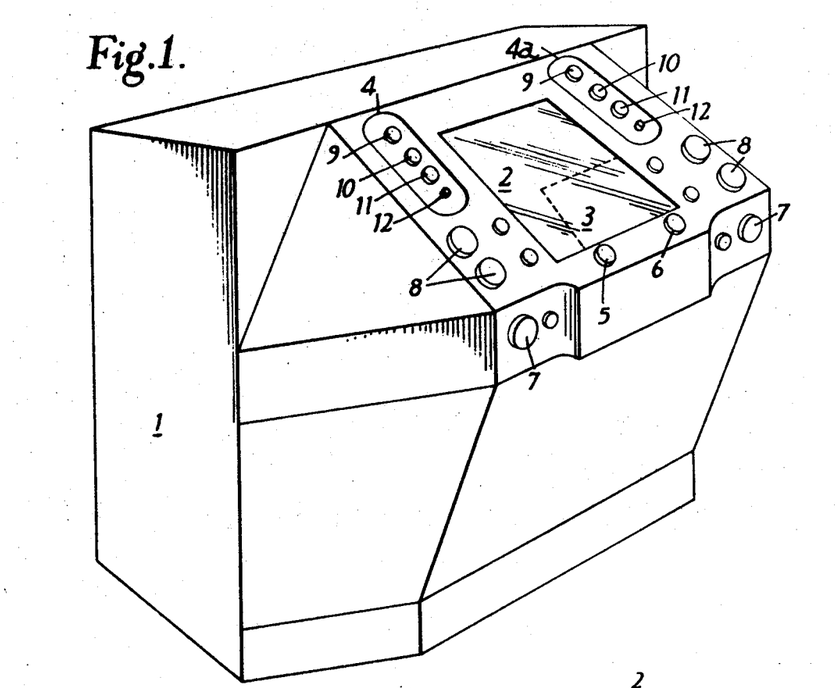
FIG. 1 is a diagrammatic view of one form in the machine in accordance with the invention.

Referring to FIG. 1 of the drawings there is shown a console 1 embodying a viewing screen 2 in which there is illustrated a layout of a business form 3 located within the machine as will be hereinafter described. The console includes a plurality of vertical projection controls 4 and a plurality of horizontal projection controls 4a. It also includes a filter control device 5 and a light intensity knob 6 for the control of the illumination of the business form 3. Each of the vertical projection controls and the horizontal projection controls include a line space control 7 and line length controls 8. In addition there are included other vertical and horizontal controls for the machine including an image selection knob 9, a filter selection 10, a light intensity control 11, and an exposure control 12.

Figure 2:
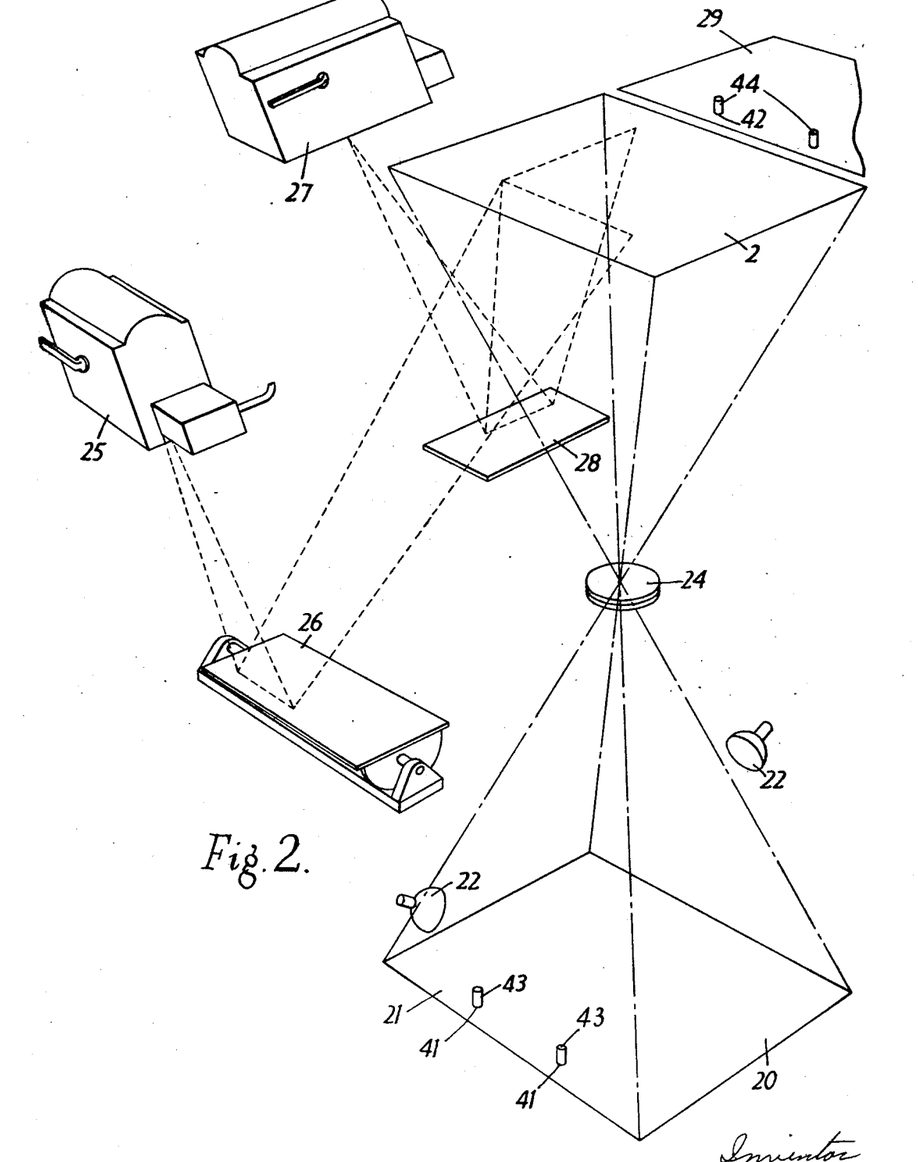
FIGS. 2, 3 & 4 are diagrammatic views of part of the machine.
Figure 8:
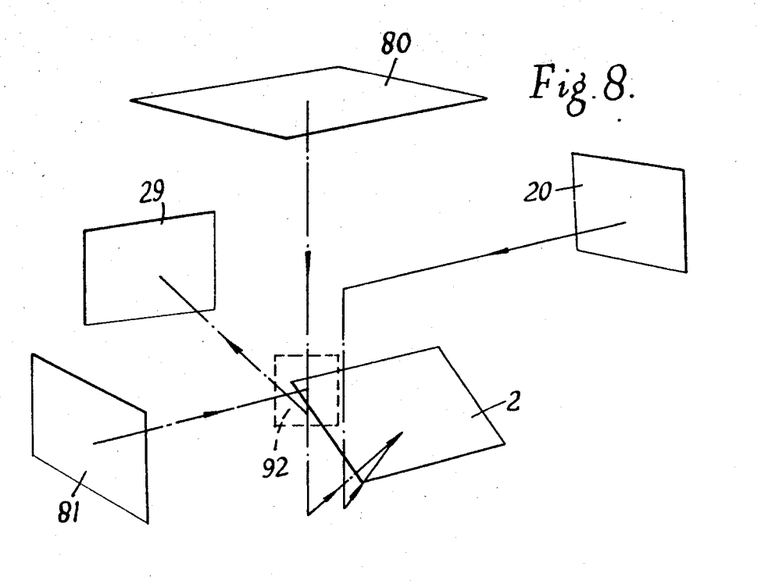
FIGS. 8 to 11 are diagrammatic views of a further machine.
Figure 13:
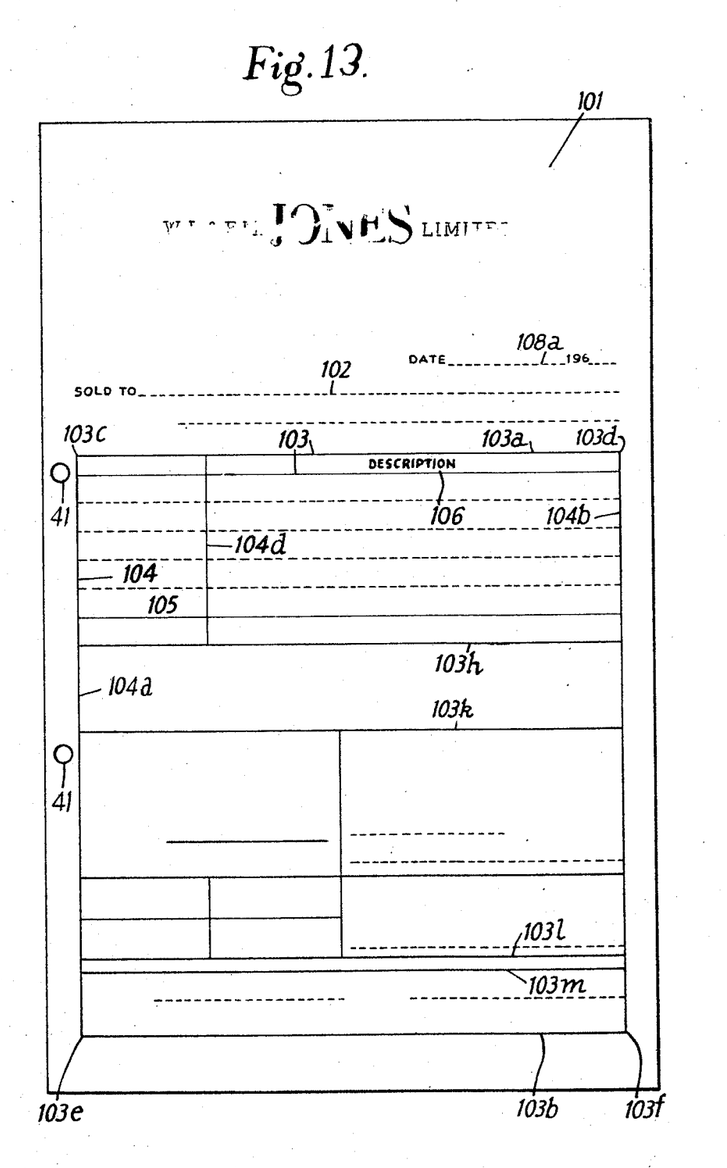
FIG. 13 is a view of a copy form.

Referring to FIG. 2 of the drawings there is shown a copy sheet 20 which represents, for example, a single form length of a business form to be printed. The copy sheet 20 may be a sheet drawn by an artist or draftsman to show a customer the kind of business form layout it is proposed to supply to him. Alternatively it may be a form length of a business form, perhaps amended, previously supplied and which the customer requires to be repeated. The copy form 20 is illuminated by a pair of lamps 22 and it is arranged that an image of this copy sheet is reproduced on a viewing screen 2 on the console 1 by virtue of an optical system represented diagrammatically at 25. As shown in FIG. 8 the business form shown is a single part form of an invoice one single form length in size. The business form is originally designed as a copy sheet 20 (FIG. 13) in which there is included the heading 101 including the name and address of a firm issuing the invoices. There is also included a space 102 to receive the name and address of the person to whom the invoice is to be sent. The body of the form is divided up into areas which refer to certain aspects of a business transaction. Thus, there are provided a plurality of horizontal lines 103 and a plurality of vertical lines 104. These lines provide columns 105 each relating to certain information. There is as well typographical information 106 related to a description of matter appearing in the various columns 105 and other information relating to the general content of the invoice. In addition there are miscellaneous lines 108l related for example to date of the invoice but other lines may be included on the form for various other purposes. It will be apparent that lines 103, 104 may be of different thicknesses to suit customers requirements. Referring again to FIG. 2 a vertical projector image mechanism 25 to be hereinafter described projects an image of a line in the form of a line of light onto the viewing screen 2. The image is first of all projected onto a movable mirror 26 so positioned that the image of the vertical line of light on the viewing screen 2 is in correct focus and in the correct position on the viewing screen 2. Likewise, a horizontal image projector mechanism 27 similar in construction to the vertical projector mechanism 25 but located at an angle of 90° from the vertical projector mechanism projects a horizontal line of light onto the viewing screen 2. Likewise, the horizontal line of light is reflected onto the viewing screen by a mirror 28 which is likewise movable so that the image of the line on the viewing screen is in correct focus and in the correct position on the viewing screen 2. Sensitized reproduction material 29 which may be actinic light sensitized film is mounted on a support means (not shown) in such a way that the sensitized material is movable from an inoperative position as shown to an operative position closely adjacent to the viewing screen 2 so that an image of actinic light is irradiated onto the reproduction material at a predetermined position thereon so that actinic lines of light provided by the vertical and horizontal projector mechanisms 25 and 27 are reproduced on the reproduction material 29.

Figures 3, 12:
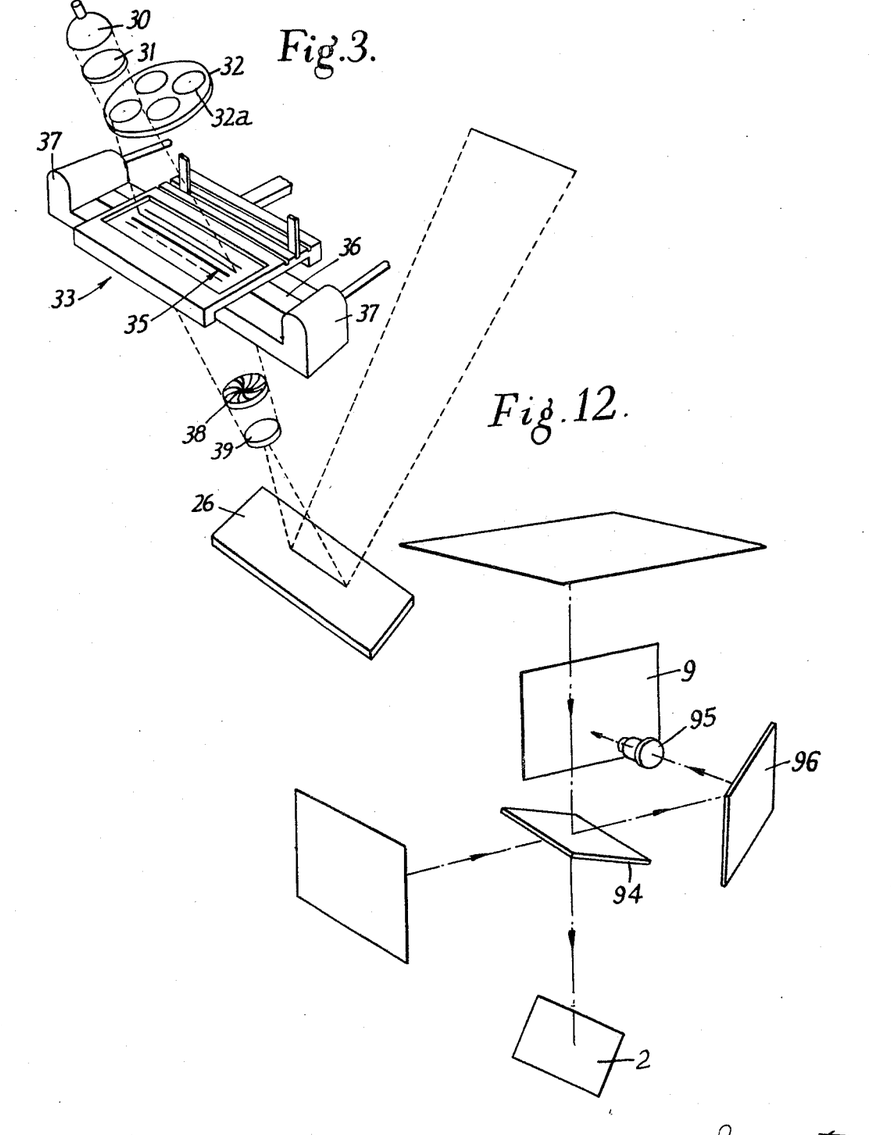
FIG. 12 shows a schematic view of a still further machine.

FIG. 3 shows in more detail the mechanism for projecting the image of the line from the projector mechanism onto the viewing screen. As shown the projector mechanism includes a light source 30, an optical condenser system 31 and a filter turret 32. This filter turret 32 carries four light filters 32a so that light of a predetermined color may be directed to the viewing screen 2. Thus the filter turret may embody four different light filters so that, for example, red, yellow green and blue light may be passed to the viewing screen.

An image selector unit 33 is provided beyond the filter turret 32 and this consists of a carrier capable of carrying a master sheet 35 on which are formed straight lines of different thickness. The master sheet 35 is preferably of black material in which thin straight lines are cut in the sheet or certain straight parts of the black sheet are rendered transparent by a photographic process. These lines are of different thickness so that a desired thickness of line can be selected. The sheet 35 may also include dotted lines or chain dotted lines. This carrier is movable into and out of the position by a drive means (not shown) operable from the console of the machine by operation of the image selection knob 9. The image unit 33 also includes a gap 36 over which the sheet 35 is positioned. The gap 36 is closed at its opposite ends by a masking mechanism 37. This mechanism 37 is operated by the line length control mechanism 8 on the console which causes a flexible band or rigid plate in the mechanism to act as a cover for the gap whereby the portion of the cut line on the master sheet 35 through which light passes and the image of which is passed through the gap 36 to the screen 2 may be limited. By this means the length of the image of the line formed on the viewing screen may be determined. The width of the line is altered by selecting the width of the line on the sheet 35. Alternatively a dotted line or chain dotted line may be selected.

Figure 4:
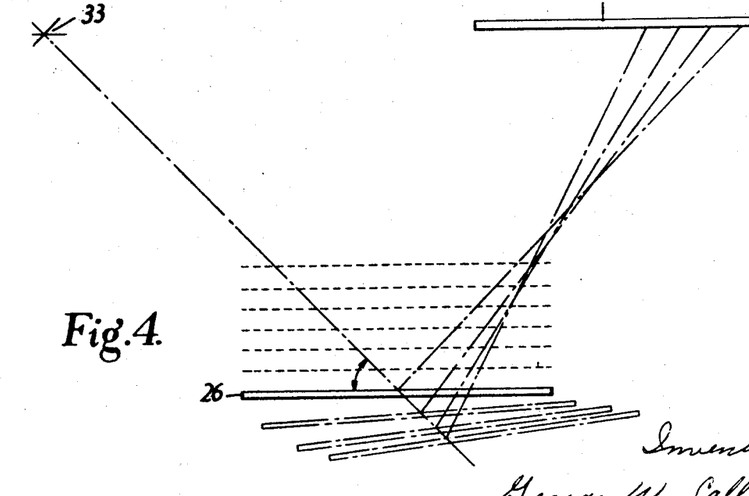

Beneath the carrier 33 there is provided an iris diaphragm 38 and a lens system 39. There is also provided the mirror 26 whose position may be adjustable to ensure that the image on the screen 2 is in the correct position and in focus. As shown more particularly in FIG. 4 the mirror 26 is moved in such a way that the image produced from the object 33 is in focus. It is desired that the image of the lines drawn on the sheet 35 shall be positioned at different positions on the viewing screen 2 and to accommodate for this the mirror 26 is pivoted. However, if it is not possible to arrange for the mirror to be at right angles to the viewing screen this will mean that the image would normally be out of focus depending upon its position on the viewing screen. However, to accommodate for this the mirror 26 is given a vertical displacement in addition to its angular display in dependence of its position on the viewing screen of the image of the line.

The horizontal image projector mechanism is similar to the vertical image projector mechanism as hereinbefore described except that the mirror 28 as well as the other components of the mechanism is arranged at right angles to the vertical projector mechanism 25. When it is required to reproduce on sensitized film details of a business form similar to that shown in FIG. 8 the form to be copied is located in locating mechanism as shown at the position 21 in FIG. 2. The lamps 22 are directed onto the copy sheet 20 so that an image of the copy sheet is provided on the viewing screen 2. The thickness of line to be used on the business form is then selected by determining the thickness of line on the sheet 35 to be reproduced on the viewing screen 2 and this selected line is placed over the gap 36. The light source 30 is then rendered operative and a reproduction of the selected line on the sheet 35 is shown on the viewing screen 2. It is required that the line so produced on the viewing screen is selected to represent one of the lines on the copy sheet 21. Thus, for example the thin vertical line 104 on the left-hand side of the left-hand column 105 specifying quantity may be selected. This is a thin line so a thin line is selected on the sheet 35 located over the gap 36. The position of the mirror 26 is so adjusted that the line on the viewing screen overlies the selected vertical line 104 on the copy sheet 20 shown on the viewing screen 2.

The length of the line on the viewing screen is adjusted by adjusting the position of the flexible band mechanisms 37 so that the image of the line of light produced on the screen from the light source 30 corresponds with the length of the line of the image produced from the copy sheet 20. The respective mechanisms at opposite ends of the line are adjusted to give the required length. Similarly, the position of a horizontal line, for example the uppermost horizontal line 103 of the horizontal columns, is reproduced on the viewing screen 2 by energizing the light source 30 of the horizontal projection mechanism 27 and adjusting this line as had been described in connection with the adjustment of the vertical line.

When a box composed of horizontal and vertical lines is to be composed the length of the horizontal and vertical lines are each checked by selecting a line at one side of the box and moving it to the other side of the box. Thus, if the thick left-hand vertical line 104 is selected and the horizontal line shown at 103a is selected it must be ensured that the ends of these two lines coincide at position 103c. Subsequently the position of the vertical line 104 is moved to the right (FIG. 8) until it is in the position taken up by the line 104b on the form when it must be ensured that the ends of these two lines coincide at position 103d. Similarly the horizontal line 103 is moved downwardly until it lies in the position shown by the line 103b and the ends of the two lines are again checked at positions 103e, 103f. The positions of the image of the lines 103a, 103b, 104a, 104b are adjusted by movement of the respective mirrors 26, 28. Alternatively this can be attained by movement of the image unit 33 including the masking band mechanism 37 of the vertical image projector mechanism and of the horizontal image projector mechanism whereby the line of a predetermined thickness is projected in the required portion on the viewing screen 1 and on the sensitized material 29. In a further modification the position of the image can be changed by moving the position of the viewing screen 2 and sensitized material 29.

It is of considerable importance in determining the length of the lines in this case to have the horizontal line of one color and the vertical line of another color. This is attained by means of the filter turret 32. It is also important that the color of the vertical and horizontal lines shall differ from the colors of the copy sheet 21 to be copied. The colors selected should be as far apart from one another as can be obtained. Thus, for example, if a copy sheet 21 consists of a green colored paper with red colored printing as of the heading 101 on it the colors selected for horizontal and vertical lines will be of blue and yellow colors respectively.

When the position and length of a selected image of a reproduced line is satisfactorily obtained on the viewing screen 2 the reproduction film material 29 is moved into position closely adjacent to the viewing screen 2 and the film material is subjected to an exposing action so that actinic light from the light source 30 corresponding to a black line on the form is irradiated upon the film material to expose a portion of it corresponding to a black line.

When the length of a line, for example the line 103a is determined this line is moved downwards in order to expose the lines 103h, 103k, 103l, 103m in turn.

It may be required for example to set up the position of the line 103h after exposure in order to set up the position and length of the line 104d and to do this a line position retrieval mechanism is incorporated in the machine. Similarly a line length retrieval mechanism is incorporated in the machine. This retrieval mechanism may incorporate line stop mechanism similar to the tabulating stop mechanism on a typewriter. Alternatively the retrieval mechanism may include a magnetic tape device to which a signal is applied to correspond for example to a line position and which tape moves in synchronism with an image unit or other movable mirror or lens mechanisms. When the signal is applied this is used to halt the image unit or lens or mirror so that the image appears in the required position on the viewing screen 2 or sensitized material 29.

This operation is repeated for all the lines on the form until all the lines shown on the copy sheet are reproduced on the film 29.

It is important that the reproduction sensitized material and the copy sheet 20 shall be accurately located in position in the machine. For this purpose locating holes 41 are located in the copy sheet 20 and locating holes 42 are formed in the sensitized reproduction material. The sheet and material are located on complementary posts 43, 44 respectively in the machine to ensure that these sheets can be relocated in the same position if they are removed.

Figure 5:
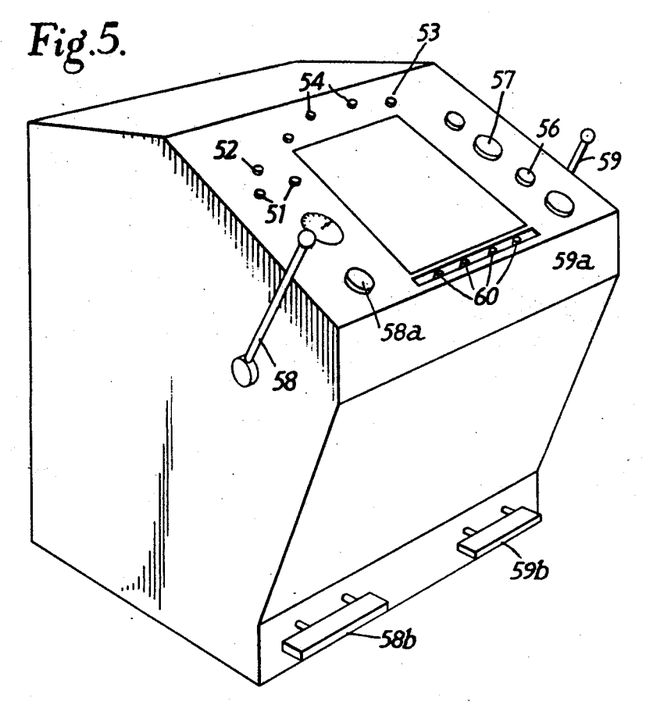
FIG. 5 is a view of a modified form of the machine.
Figure 6:
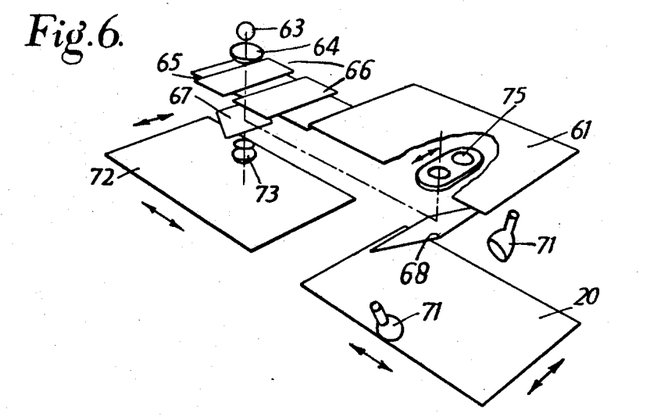
FIG. 6 is a diagrammatic view of part of the machine shown in FIG. 5.

Referring to FIG. 5 and 6 of the drawings, FIG. 5 shows a console similar to FIG. 1 and FIG. 6 shows diagrammatically an arrangement of the parts of the machine. Referring to FIG. 5 the console 50 has control devices 51 to control the size of the image and a control knob 52 whereby a reduction in size say 10 percent of the size of the image is obtained. Control knobs 53, 54 control the operation of the left- and right-hand masks to be hereinafter described and control knobs 54 determine which of the text columns are to be selected. The control knobs 55, 56 control the operation of the upper and lower masks and the control knob 57 controls the operation of the text image negative movement. A control lever 58 on the left-hand side of the machine controls vertical movement of the image of the text on the viewing screen and the control lever 59 controls movement of the text on the viewing screen in a horizontal direction by virtue of movement of the text on the copy sheet 20. A further pair of slow movement knobs 58a, 59a enables more accurate positioning of the copy sheet 20 to be obtained. The copy sheet 20 is locked in position by means of respective foot lock controls 58b, 59b. The control knobs 60 determine the color of the image of the text on the screen. Referring to FIG. 6 there is shown a light source 63 and a condenser lens system 64. A text negative 65 is located beneath the lens system 64. A text negative consists of a sheet of black paper, film or the like material on which there is cut out or rendered transparent certain areas. These areas are inscribed with certain wording, figures, patterns etc. Thus for example the words Description, Date, Signature, Total may be inscribed on the sheet. These are the words which are produced on the copy sheet 20 and are required to be reproduced onto the sensitized film to reproduce on the sensitized film the image of the copy sheet 20. A pair of the vertical masks 66 as well as a pair of horizontal masks (not shown) are also located beneath the lens system 64. These pairs of masks are respectively located on opposite sides of the text negative 65. For the sake of clarity the horizontal masks are not shown. A reflector 67 of the kind known as a semitransparent mirror and also sometimes called a Beamsplitter through which some light passes and some is reflected is located beneath the text negative 65 and a further semitransparent mirror 68 is located beneath the glass viewing screen 61.

A copy sheet 20 is located beneath a pair of illumination lamps 71 so arranged that an image of this copy sheet is reproduced on the viewing screen 61 in a similar manner to that described in connection with FIG. 2. A support for this copy sheet 20 also serves as a support for a sheet of light sensitive film material 72 so that the copy sheet and the light sensitive film material move in synchronism one with the other under the control of the levers 58, 59, knobs 58a, 59a and locked by the controls 58b, 59b.

It is arranged that a selected text negative for example comprising the word "Description" is located beneath the vertical masks 66 and above the horizontal masks so that the selected text only is reproduced on the viewing screen 61. Owing to the use of the semitransparent mirrors 67, 68 the material reproduced on the viewing screen 61 is also irradiated on the light sensitive film material 72 when a shutter and lens mechanism 73 is operated. The detail of the text negative is reproduced on the viewing screen 61 and the image of this text negative is determined by altering the position of the copy sheet 20 so that the position of the text negative relative to the copy is determined. Because the position of the text upon the copy is determined the position of the text on the light sensitive film material will also be determined. Hence actinic light from the light source 63 is allowed to irradiate on the light sensitive material 72 by virtue of the operation of the shutter 73 so that the light sensitive film material 72 is exposed with the text upon the text negative 65.

It is usual for the ruled lines to be provided on the sensitive film first by virtue of the mechanism shown in FIG. 1 to 4 and subsequently details of text be applied to predetermined positions on the film by virtue of the mechanism shown in FIGS. 5 and 6.

A lens system 75 including two alternative lens units is located beneath viewing screen 61 to enable the image of the lines and text on the copy sheet 20 to be enlarged to enable more accurate positioning of the text to be obtained. The appropriate lens unit is selected by operation of the appropriate control device 51. No enlargement of the image on the sensitized material will be provided.

If it is required to reduce the size of the text, for example, so that the text may be reproduced on the sensitized material between for example a pair of lines very close together the size of the text may be reduced by rendering operative the 10 percent image reduction lens system into the system between the text negative and the semitransparent mirror 67. This mechanism is operated by the image reduction mechanism 52 on the console (FIG. 5).

In order to control the positioning of the text negative on the sensitive material 72 a retrieval mechanism is incorporated into the control of movement of the copy sheet 20 and light sensitive material 72 and a retrieval mechanism is incorporated into the positioning mechanism. This retrieval mechanism may correspond to the tabulator stop mechanism on a typewriter.

Figure 7:
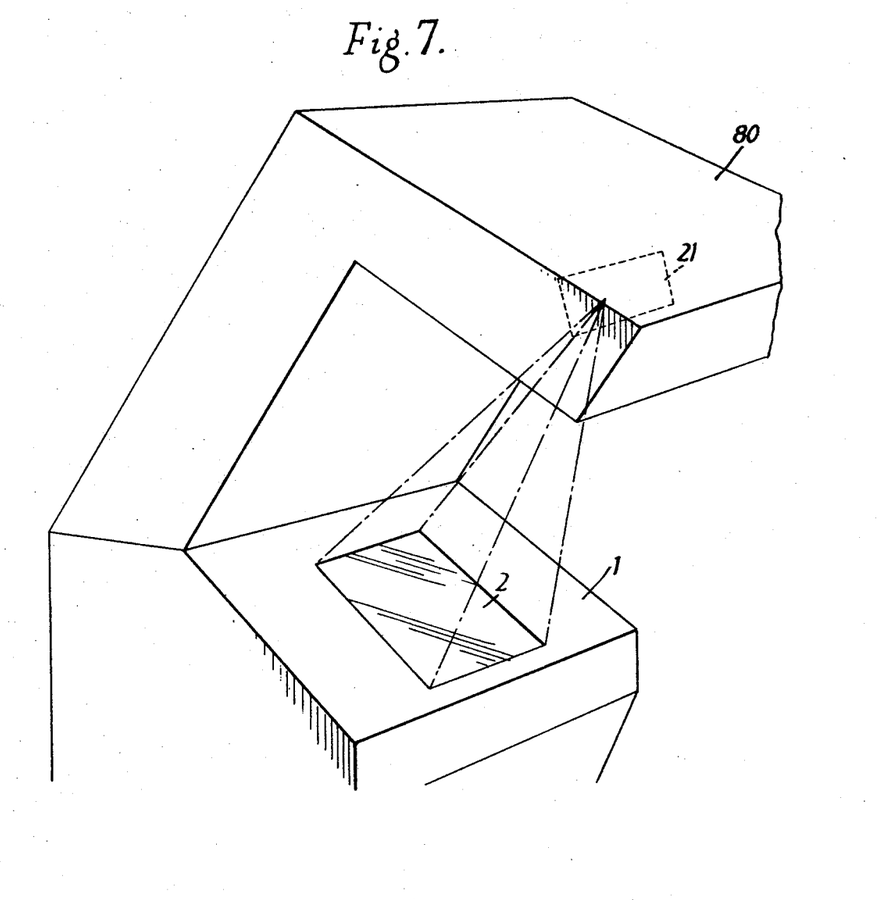
FIG. 7 is a view of a further modified machine.

Referring to FIG. 7 there is shown a modified form of mechanism in which details of a copy 20 are arranged in a head portion 80 of the mechanism and this copy 20 is irradiated by an actinic light mechanism (not shown) to cause a copy to be illuminated on the viewing screen 2 on the console 1.

Referring to FIG. 8 of the drawings, which schematically illustrates the further machine there is shown a copy sheet 20, a viewing screen 2 and sensitized film material 29. A first mechanism 80 which constitutes a text or horizontal line image projection means is irradiated by light (not shown) whereby the image of the line or text is projected to the viewing screen 2 and a similar image can be applied to the sensitized material 29. Likewise a second mechanism 81 which constitutes a vertical line image projection means is so arranged as to be irradiated by light in such a manner that an image of the line is projected on the viewing screen 2 and can be applied to the sensitized material 29. The mechanism 80 shown schematically may represent an image projector mechanism similar to the image projector mechanism including the color filter mechanism image selector unit, etc. shown in FIG. 3 or alternatively may represent an image projector mechanism similar to the image projector mechanism shown in FIG. 6. Alternatively it may represent an image projector mechanism similar to that shown in FIG. 3 in which the sheet 31 to be reproduced on the viewing screen bears text material for example including a word description instead of a selection of lines. Likewise the mechanism 81 may represent an image projector mechanism similar to the image selector unit 33 shown in FIG. 3.

The image of the copy 20 is projected through one optical system onto the viewing screen through one optical system (not shown) whereas the images of the mechanisms 80 and 81 are merged and projected onto the viewing screen through a second optical system. A mirror 92 can be moved into and out of the optical path of the light of the images of the mechanisms 80 and 81 (but not the optical path of the light from the copy sheet 20) to reflect the light to reproduce the images of the mechanisms 80 and 81 on the sensitized material 29 in one position of the mirror 92 the light passes to the viewing screen 2 whereas in the other position of the mirror the light passes to the sensitized material 29.

Figure 9:
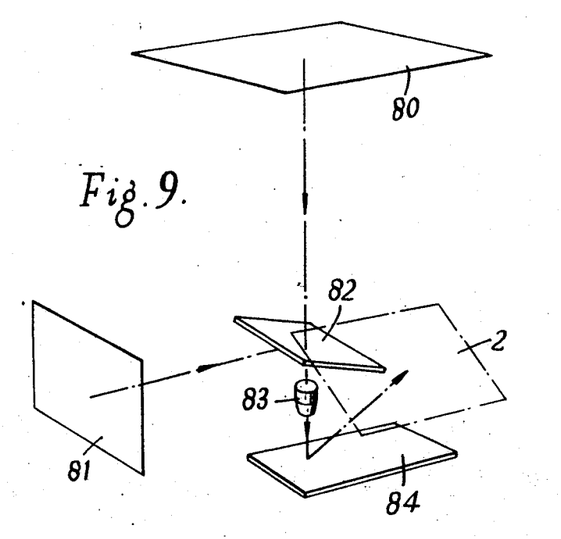

Referring to FIG. 9 of the drawings which represents part of the machine shown schematically in FIG. 8 there is illustrated diagrammatically the optical system employed to produce the horizontal line and text image as well as the vertical line image on the viewing screen 2. As shown the horizontal line and text mechanism 80 cooperates with a semitransparent mirror 82 and a lens system 83 as well as a plain mirror 84 to produce the image represented by the image unit 33 on the viewing screen. The light from the horizontal line and text mechanism 80 is directed through the semitransparent mirror 82 and through the lens system 83 onto the plain mirror 84 from where it is reflected on to the viewing screen 2. In like manner the image from the vertical line image mechanism is reflected by the semitransparent mirror 82 to pass through the lens system 83 and be reflected from the mirror 84 onto the viewing screen 2. It will be apparent that the two light systems merge by virtue of the use of the semitransparent mirror whereby the images of the mechanisms 80 and 81 are reproduced on the same viewing screen 2.

Figure 10:
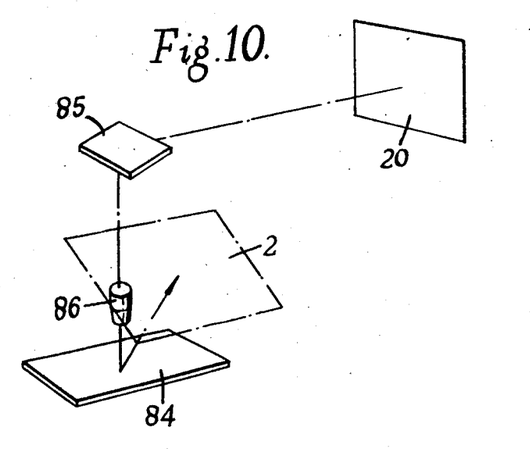

Referring to FIG. 10 there is shown a mechanism to receive a copy sheet 20 which copy sheet is irradiated by light and the image of the copy sheet 20 is reflected by the mirror 85 through a second lens system 86 to the mirror 84 also shown in FIG. 9 whereby the image of the copy sheet can be directed to the viewing screen 2. Thus the images of the copy sheet 20 and of the mechanisms 80 and 81 are merged by virtue of the use of the lens systems 83 and 86 whereby a single compound image is reproduced on the viewing screen 2.

Figure 11:
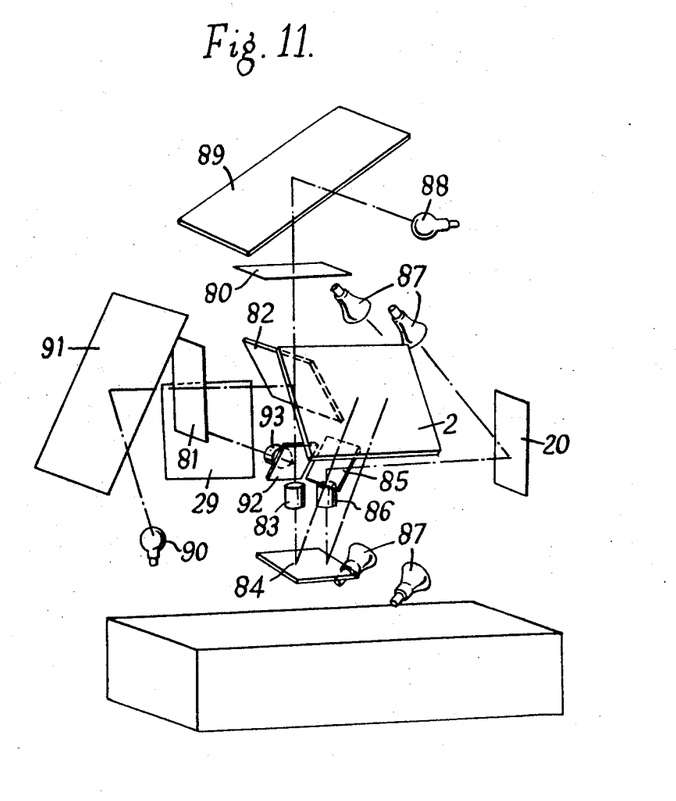

It will be apparent that the features of FIGS. 8, 9 and 10 are combined and shown in FIG. 11. As shown in FIG. 11 the copy sheet 20 is irradiated by the lamps 87 whereby an image of the copy sheet is reflected by the mirror 85 through the lens system 86 to the plain mirror 84 whereby the image of the copy sheet 20 is displayed on the viewing screen 2. Likewise an image of the horizontal line and text mechanism 80 is produced by irradiating the text and horizontal line mechanism by a lamp 88 from a reflecting mirror 89. The image is passed through the semitransparent mirror 82 and through the lens system 83 and the plain mirror 84 onto the viewing screen 2. Likewise the vertical text mechanism 81 is irradiated by light from the lamp 90 by a mirror 91. The image of the vertical text mechanism is reflected by the semitransparent mirror 82 and directed through the lens system 83 and reflected by the mirror 84 onto the viewing screen 2. An additional mirror 92 is capable of being moved into and onto the path of the light between the semitransparent mirror 82 and the lens system 83 to be capable of directing this light through a lens system 93 onto the sensitized material 29.

This mirror 92 does not reflect light from the copy sheet so that the image of the copy sheet does not affect the sensitized material 29. The mirrors, lens systems are adjusted by virtue of the switches and operating devices on the control panel of the machine which may correspond to the panel shown in FIG. 1. The adjustment may be effected by mechanical linkages, or electrical or mechanical drive or follow up mechanisms.

When a machine as shown in FIG. 11 is in operation the copy sheet 20 is located in the copy sheet viewing position and the necessary lines are selected in the mechanisms 80 and 81 as to length and thickness in the manner described in connection with FIG. 3. Alternatively the required text may be inserted into the mechanism as shown in FIG. 6 or in FIG. 3 to produce the required text image. If text is to be incorporated into the image unit 33 it will be necessary to have two flexible masking mechanisms 37 for horizontal adjustment and another similar masking mechanism at right angles thereto for vertical adjustment so that the text can be correctly located on the viewing screen 2 and on the sensitized material 29. The required lamps 87, 89 and 90 are illuminated and the mechanisms, mirrors and/or lens system or the image unit 33 are adjusted whereby the image of the copy sheet 20 is reproduced on the viewing screen 2 at the desired position and likewise lines corresponding to the lines on the copy sheet 20 are also reproduced on the viewing screen 2. The position of the horizontal lines on the viewing screen are adjusted by virtue of an adjustment to the image unit 33, mirrors and/or lens systems whereby these lines correspond to or overlap the image on the viewing screen 2 of the copy sheet 20. The length and thickness of these lines is adjusted in the mechanisms 80 and 81. Similarly the vertical line mechanism is also operative to produce on the viewing screen 2 an image of the vertical lines corresponding to the vertical lines on the copy sheet 20 and these vertical line images are also lined up to the viewing screen so that they too are correctly positioned. When the images are correctly positioned the mirror 92 is moved into the path of the light between the semitransparent mirror 82 and the lens system 83 whereby the image of the mechanisms 80 and 81 is directed onto the sensitized material 29 rather than onto the viewing screen 2. The sensitized material is thus irradiated with the image of the line or text mechanism at the required places. This operation is repeated several times until all the lines and text on the copy sheet 20 are reproduced by the sensitization of the sensitized material 29.

It will be apparent that the intensity of the light bulbs 87, 88 and 90 and the disposition of the various mirrors and lens systems and the time of exposure of the sensitized material is so selected that the sensitized material 29 is irradiated by the required extent to enable the sensitized 29 subsequently to be developed and later on subjected to further processes whereby printing plate can be produced.

FIG. 11 shows a further embodiment in which the image from the horizontal line and text image mechanism is projected to a semitransparent mirror 94 and likewise the image from the vertical line mechanism 81 is projected onto the semitransparent mirror 94. It is arranged that the image from the horizontal line mechanism is transmitted through the semitransparent mirror onto the viewing screen 2 whereas the image is reflected in the semitransparent mirror to the sensitized material 29. On the other hand the image from the vertical line mechanism is projected onto the semitransparent mirror 94 and the image is transmitted through the mirror to the sensitized material 29 and is reflected by the mirror to the viewing screen 2. A lens system 95 is arranged between the semitransparent mirror 94 and the sensitized material 29. The lens system 95 includes an iris shutter mechanism to shut off the light to the sensitized material 29 until the line or text image is adjusted to the required position on the viewing screen 2 and is thereby correctly directed towards the sensitized material.

I claim:

1. A photocomposing machine comprising means for displaying a representation of a copy form, means to project a light image pattern onto the representation so that the light image pattern is identical with and overlies a part of the representation of the copy form, means to irradiate sensitized material with actinic light in a pattern corresponding to the pattern projected onto the representation to expose the sensitized material in accordance with the irradiated pattern, and means to adjust the positions of the projected and exposure patterns so that the whole representation is exposed on the sensitized material as a copy of the representation.

2. A photocomposing machine according to claim 1 wherein said means to adjust includes a mirror which is movable into and out of the path of the projected light image whereby in one position the light is transmitted to form said representation and in another position the light is transmitted onto the sensitized material.

3. A photocomposing machine according to claim 1 wherein said representation is displayed onto a viewing screen and said means to project includes one lens system, said means to irradiate includes a second lens system, and said image of the line and text is projected onto said viewing screen.

4. A photocomposing machine according to claim 1 having retrieval mechanism to restore a former position of the representation.

5. A method of exposing a sensitized material to prepare a printing plate comprising projecting a light pattern representing a copy form to reproduce an image of the copy form on a viewing screen, projecting an image of light in a pattern onto the viewing screen corresponding to a part of the image of the copy form, irradiating the said image of light onto sensitized material at positions corresponding to the irradiated pattern on the viewing screen to expose the sensitized material according to the irradiated pattern, and adjusting the positions of the patterns of light on the viewing screen and on the sensitized material whereby the sensitized material is exposed to correspond to the image of the copy form.